(12) United States Patent
Singh et al.

(10) Patent No.: US 9,055,385 B1
(45) Date of Patent: Jun. 9, 2015

(54) ADJUSTING AN APPLICATION UPDATE RATE IN A WIRELESS COMMUNICATION DEVICE

(75) Inventors: Jasinder Pal Singh, Olathe, KS (US); Sachin R. Vargantwar, Overland Park, KS (US); Maulik K. Shah, Overland Park, KS (US); Siddharth S. Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 928 days.

(21) Appl. No.: 12/949,284

(22) Filed: Nov. 18, 2010

(51) Int. Cl.
*H04W 4/00* (2009.01)

(52) U.S. Cl.
CPC .................................... *H04W 4/003* (2013.01)

(58) Field of Classification Search
CPC ... H04L 12/588; H04L 51/32; H04L 67/1044; H04L 67/1053; H04L 64/1059; H04L 67/16; H04L 67/30
USPC ............................................ 455/67.11, 452.2
See application file for complete search history.

(56) References Cited

U.S. PATENT DOCUMENTS

| 6,317,754 B1 | 11/2001 | Peng |
| 7,711,806 B1 | 5/2010 | Roka et al. |
| 7,792,051 B2 * | 9/2010 | Aaron et al. .................. 370/252 |
| 2004/0107236 A1 | 6/2004 | Nakagawa et al. |
| 2004/0132438 A1 | 7/2004 | White |
| 2007/0180477 A1 | 8/2007 | Hutcheson |
| 2008/0052387 A1 | 2/2008 | Heinz et al. |
| 2008/0189439 A1 | 8/2008 | Chitre et al. |
| 2009/0225778 A1 | 9/2009 | Sharif-Ahmadi et al. |
| 2010/0087184 A1 * | 4/2010 | Stoev et al. ................ 455/422.1 |
| 2011/0126185 A1 * | 5/2011 | Waris et al. ................... 717/169 |

* cited by examiner

*Primary Examiner* — David Bilodeau (57) ABSTRACT

Embodiments disclosed herein provide systems and methods for adjusting the rate at which an application retrieves data updates based upon application usage. In a particular embodiment, a method provides exchanging communications with a wireless communication network. The method further provides executing an application that exchanges application data in the wireless communication device with the wireless communication network. The method further provides determining an application usage rate for the application and adjusting an application update rate for the application based on the application usage rate. Additionally, the method provides updating the application data over the wireless communication network based on the application update rate.

16 Claims, 6 Drawing Sheets

ADJUSTING AN APPLICATION UPDATE RATE IN A WIRELESS COMMUNICATION DEVICE

TECHNICAL BACKGROUND

Wireless communication devices, such as cellular telephones, communicate with other devices and systems over wireless communication networks. A wireless network may provide a wireless device with voice and data communication services. In particular, data communications between a wireless network and a wireless device may be limited by an amount of bandwidth available to multiple devices connected to the wireless network. Consequently, the data usage by one wireless device impacts the amount of data bandwidth available to other devices also connected to the wireless network.

A wireless device may be capable of executing various applications on the wireless device. Specifically, applications such as social networking applications, sports score applications, stock market applications, calendar applications, and gaming applications may retrieve application update data from a device or system over a wireless network. For example, the sports score app may periodically retrieve score updates for in progress sporting events. As these applications retrieve updates over the wireless network, the applications use both wireless network data resources and resources on the wireless device.

Overview

Embodiments disclosed herein provide systems and methods for adjusting the rate at which an application retrieves data updates based upon application usage. In a particular embodiment, a method provides exchanging communications with a wireless communication network. The method further provides executing an application that exchanges application data in the wireless communication device with the wireless communication network. The method further provides determining an application usage rate for the application and adjusting an application update rate for the application based on the application usage rate. Additionally, the method provides updating the application data over the wireless communication network based on the application update rate.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
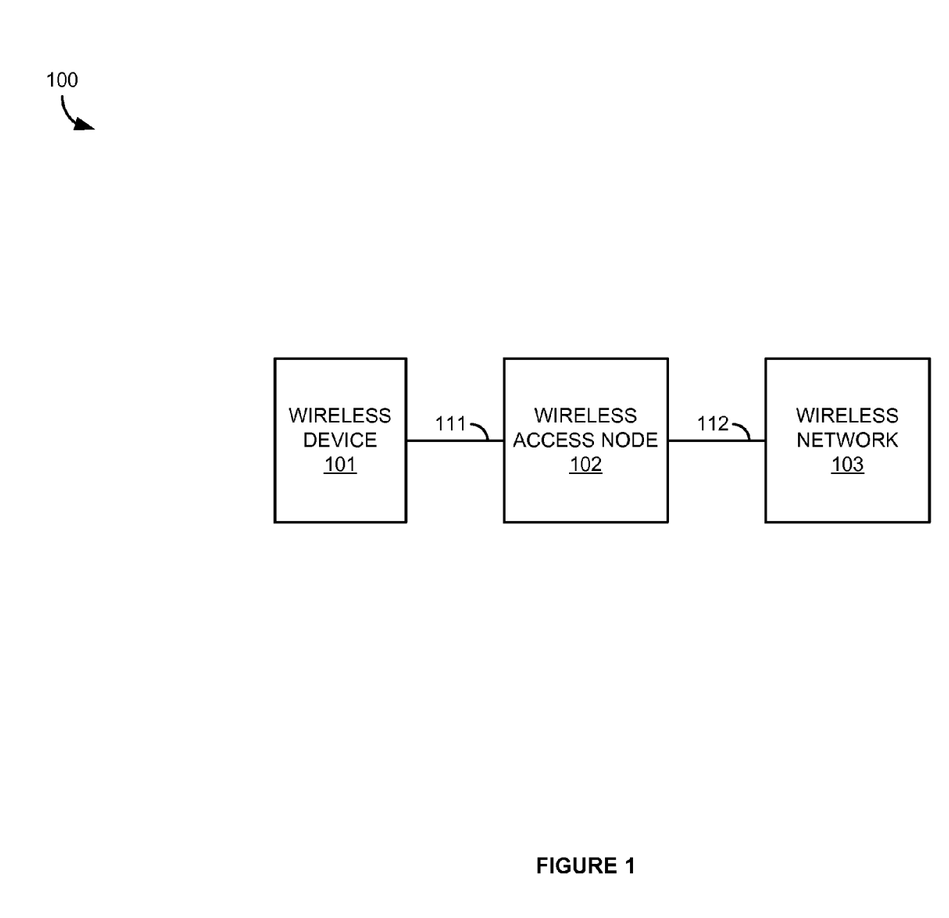
FIG. 1 illustrates a wireless communication system for adjusting an application update rate.

FIG. 1 illustrates wireless communication system 100. Wireless communication system 100 includes wireless communication device 101, wireless access node 102, and wireless communication network 103. Wireless communication device 101 and wireless access node 102 communicate over wireless link 111. Wireless access node 102 and wireless communication network 103 communicate over communication link 112.

In operation, wireless device 101 is capable of executing software applications. Some of these applications may periodically retrieve data updates in order for some functionality to operate appropriately. For example, a social networking application may retrieve update data indicating information from other users of the social network. Likewise, a sports score application may retrieve update data indicating recent sports scores.

In order to retrieve update data for applications running on wireless device 101, wireless device 101 communicates with wireless network 103 via wireless access nodes, such as wireless access node 102. An application may include a controller, such as a timer, that directs wireless device 101 to retrieve update data for the application over wireless network 103. This control may provide the application with periodic updates so the data used by the application is current.

Figure 2:
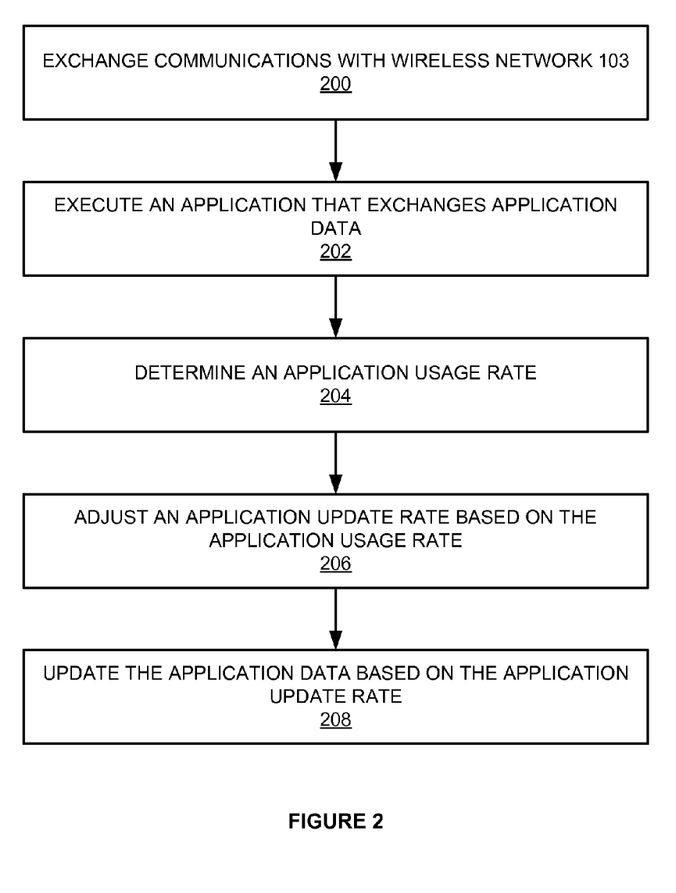
FIG. 2 illustrates the operation of a wireless communication system to adjust an application update rate.

FIG. 2 illustrates the operation of wireless communication system 100. Wireless device 101 exchanges communications with wireless network 103 (step 200). The communications exchanged may include control communications, voice communications, data communications, or any other type of communications that a wireless device may exchange with a wireless communication network. The communications are exchanged via access node 102 but may also be exchanged via other wireless access nodes on wireless network 103 or wireless access nodes on other wireless communication networks.

Wireless device 101 executes an application that exchanges application data in wireless device 101 with wireless network 103 (step 202). For example, the application may be a social networking application, sports score application, stock market application, calendar application, gaming application, or any other application that may retrieve update data from wireless network 103. The execution of the application may be initiated by a user input, an operating system request, a request from another application, or any other action that may take place in wireless device 101 that may initiate an application. The application may execute as a primary task of wireless device 101, or the application may run in the background while other applications are executed in the foreground or while the wireless device 101 is not in use by a user.

While the application is executing, wireless device 101 determines an application usage rate for the application (step 204). The application usage rate indicates a frequency of application use on wireless device 101. The application usage rate may be based on various factors. For example, the application usage rate may be based on a number of user interactions with the application within a period of time, such as the number of screen touches or button presses interacting with the application or some other type of user input into the application. Alternatively, the application usage rate may be based on the amount of time that the application is the active application for the user on wireless device 101 and not merely running in the background. Additionally, the application usage rate may be based on the amount of application data exchanged by the application with wireless network 103. The amount of application data may be in bits, bytes, packets, bandwidth, or any other method of quantifying data.

After determining the application usage rate, wireless device 101 adjusts an application update rate for the application based on the application usage rate (step 206). The application update rate regulates the frequency that the application can retrieve data updates from wireless network 103. The application update rate may be enforced by a timer located in wireless device 101. The rate may be adjusted up or down based on application usage. For example, if the application usage rate is high, then wireless device 101 may adjust the application update rate higher in order to allow the application to be updated more frequently so that the data presented by that application is up to date for a user. Conversely, if the application usage rate is low, then wireless device 101 may adjust the application update rate lower because a user does not use the application enough to require more frequent data updates.

The application update rate may be adjusted using various methods. For example, the application update rate may be proportional to the application usage rate, the application update rate may have an exponential or logarithmic relation to the application usage rate, or any other type of relation. Alternatively, wireless device 101 may reference a table or other data structure that provides application update rates that correspond to application usage rates. In some embodiments, wireless device 101 may determine a default application update rate, such as once per minute, then adjust the application update rate relative to the default rate. For example, the adjusted application update rate may be three times that of the default application update rate.

In some embodiments, the application update rate may also be adjusted based on an update profile. The update profile may be set automatically or may be set in response to a user input. For example, there may be one profile for weekday peak hours and another profile for night and weekend off peak hours. During peak usage hours on wireless network 103, a peak hour profile may limit the amount of data updates that an application may retrieve in addition to the application usage rate. The profile may be set in the application, in another application, or in the operating software of wireless device 101. The profile may be set only for the application in use or for multiple applications that execute on wireless device 101.

Instead of profiles having set times of day for peak and off peak hours, wireless device 101 may be able to determine whether wireless network 103 is experiencing high communication traffic and use a profile accordingly. Wireless device 101 may monitor control channels, query wireless network 103, or any other way of determining network congestion. Additionally, a user of wireless device 101 may provide a user input that sets update profile information. For example, the user may input that he or she wants certain applications to update more frequently no matter the application usage rate or may indicate that certain applications do not need to be updated as often.

After adjusting the application update rate, wireless device 101 updates the application data over the wireless network 103 based on the application update rate (step 208). Therefore, if the application update rate allows the application to retrieve data updates once every five minutes, then the application will retrieve data updates from wireless network 103 once every five minutes. In some situations, the application update rate may be a limit to the frequency of updates. Hence, if the application update rate is once every five minutes, then the application may retrieve updates once every five minutes at the most. Likewise, the application may have a minimum update rate limit that the application updates cannot fall below.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless communication network 103 comprises network elements that provide wireless devices with wireless communication access to application data servers. Wireless network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
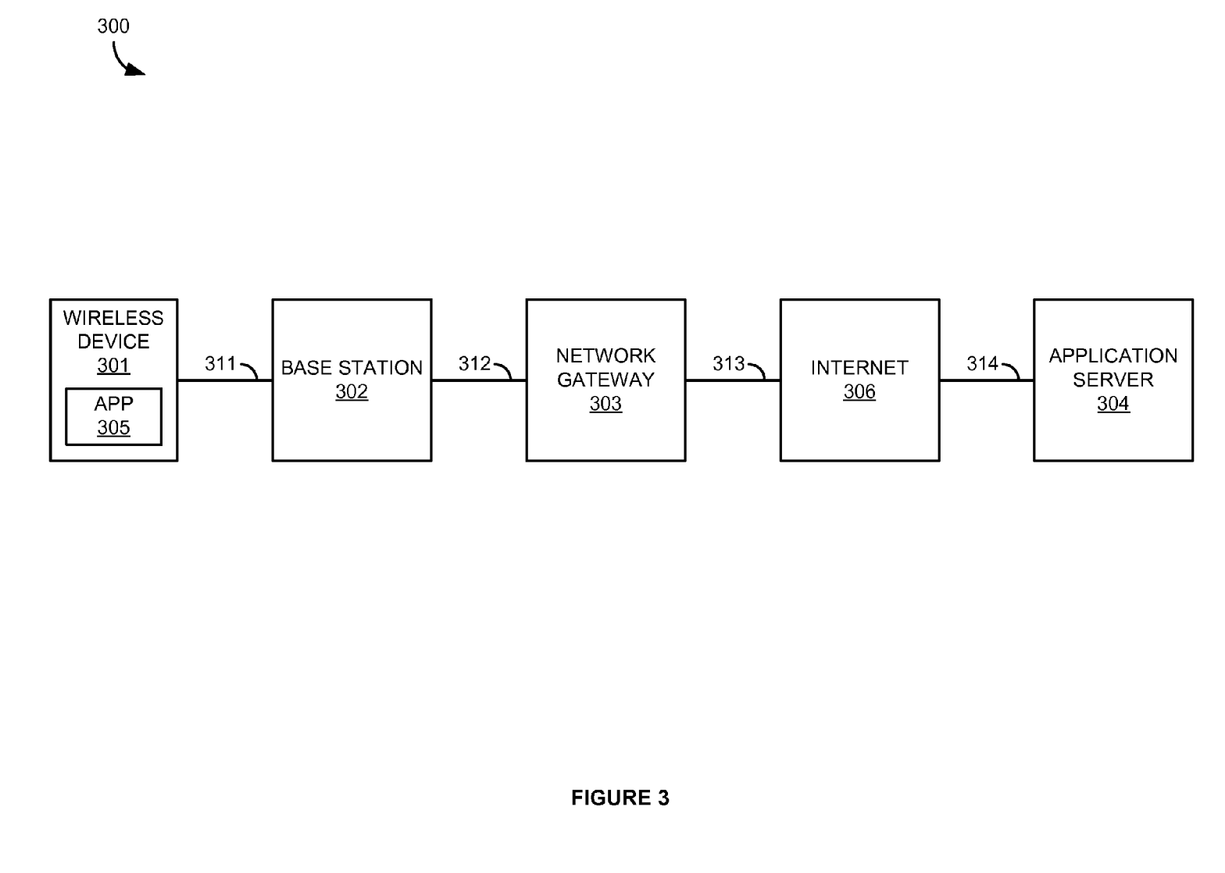
FIG. 3 illustrates a wireless communication system for adjusting an application update rate.

FIG. 3 illustrates wireless data communication system 300. Wireless data communication system includes wireless communication device 301, base station 302, network gateway 303, application server 304, and Internet 306. Application 305 executes on wireless device 301. Wireless communication device 301 and base station 302 communicate over wireless link 311. Base station 302 and network gateway 303 communicate over communication link 312. Network gateway 303 and Internet 306 communicate over communication link 313. Internet 306 and application server 304 communicate over communication link 314.

Figure 4:
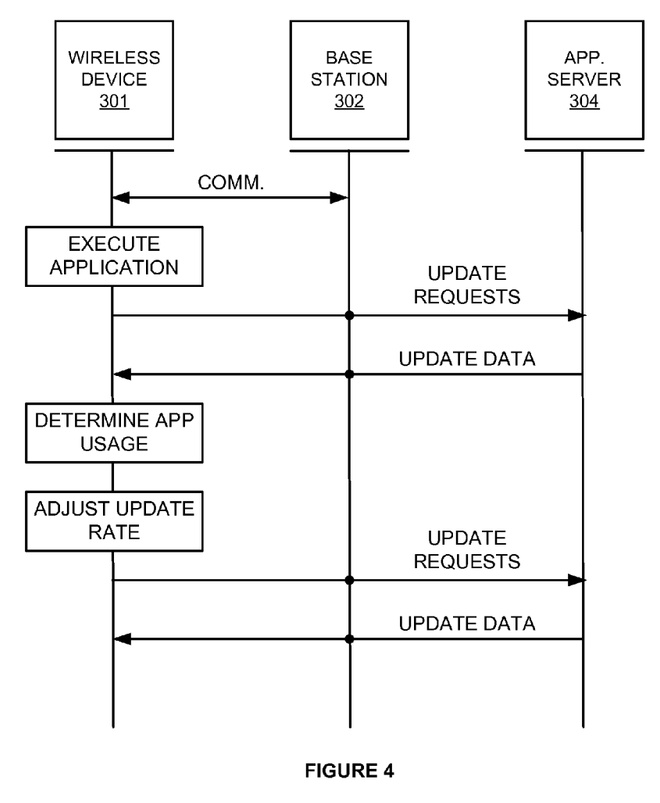
FIG. 4 illustrates the operation of a wireless communication system to adjust an application update rate.

FIG. 4 illustrates the operation of wireless device 301 in an exemplary embodiment. Wireless device 301 is exchanging communications with base station 302 of a wireless communication network. The communications may be any type of wireless communications, such as voice and data communications. A user of wireless device 301 initiates application 305 on wireless device 301. In this example, application 305 is a email application for sending, receiving, and managing email messages. The user may initiate email application 305 by touching an icon on the display of wireless device 301 that corresponds to email application 305 or by using some other form of user input to indicate to wireless device 301 that the user wishes to initiate email application 305. In response to the user indication for email application 305 to execute, wireless device 301 executes email application 305.

While executing, email application 305 requires data updates in order to present the user with the most up to date state of the email account for the user. Therefore, email application 305 transfers application data update requests to application server 304. Application server 304 is located on Internet 306. The application data is transferred to Internet 306 through base station 302 and network gateway 303. In response to the update requests, application server 304 transfers update data to wireless device 301. For example, email application 305 may be displaying the email inbox for the user. The update requests indicate that email application 305 requires the most recent messages that have been received in the email account of the user. Application server 304 determines the received messages that have not already been delivered to wireless device 101 and transfers the message information to wireless device 301. Email application 305 can then display the most recent messages in the inbox.

The frequency of the update requests is determined by an application update rate. The application update rate indicates how often email application 305 may transfer application data update requests to application server 304. In this example, the application update rate has a default value of one update every five seconds. Thus, email application 305 can instruct wireless device 301 to transfer an application data update request to application server 304 every five seconds. The application update rate may be part of email application 305, part of a separate application operating on wireless device 301, or may be located within the operating software of wireless device 301.

While email application 305 is executing on wireless device 301, wireless device 301 determines a rate at which email application 305 is being used. In this example, wireless device 301 determines the application usage rate for email application 305 by measuring the number of times that the user interacts with email application 305 over a period of time. This number may include the number of times that the user brings email application 305 to the foreground, the number of times email application 305 is in the foreground when the user interface of wireless device 301 is awoken from a standby mode, the number of user inputs into email application 305 via a user interface, or any other way that usage of email application 305 may be determined. The application usage rate may be determined by email application 305, a separate application operating on wireless device 301, or the operating software of wireless device 301.

After determining the application usage rate for email application 305, wireless device 301 adjusts the application update rate based on the application usage rate. In an example, as stated above, the default update rate may be one update every five seconds. Email application 305 may also have a default usage rate of 10 interactions, such as screen touches or button presses, per minute. The two default update rates may be based on a default level of network congestion, such as a 3 on a scale of 1-5 with 5 being the highest level of network congestion.

If network congestion increases to 4 or 5, then the application update rate may be decreased to once every ten or thirty seconds, respectively. Likewise, if network congestion decreases to 2 or 1, then the application update rate may be increased to once every three or two seconds, respectively.

Additionally, if the application usage rate is 5 interactions per minute over the default of 10, then the application update rate may be increase to once every two seconds. Likewise, if the application usage rate decreases 5 interactions per minute under the default of 10, then the application update rate may be decreased to once every ten seconds.

In some instances, both the level of network congestion and application usage rate may be balanced to adjust the application update rate accordingly. The two factors may be balanced based on a level of importance. For example, network congestion may be more important than application usage rate and, thereby, may be weighed more heavily.

Further application data update requests from email application 305 are then transferred to application server 304 in accordance with the adjusted application update rate. Application server 304 then transfers email information to wireless device 301 in response to the update requests. Wireless device 301 may then continue to determine the application usage rate for email application 305 and continue to adjust the application update rate accordingly based on the application usage rate.

Figure 5:
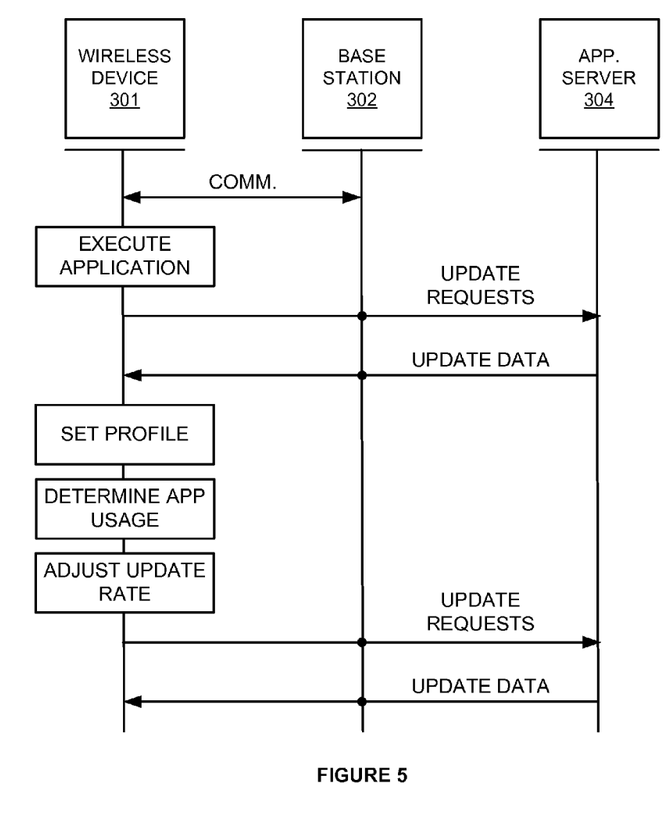
FIG. 5 illustrates the operation of a wireless communication system to adjust an application update rate.

FIG. 5 illustrates the operation of wireless device 301 in an exemplary embodiment. Wireless device 301 is exchanging communications with base station 302 of a wireless communication network. The communications may be any type of wireless communications, such as voice and data communications. A user of wireless device 301 initiates application 305 on wireless device 301. In this example, application 305 is a social networking application that displays recent postings from other social network users. The user may initiate social networking application 305 by touching an icon on the display of wireless device 301 that corresponds to social networking application 305 or by using some other form of user input to indicate to wireless device 301 that the user wishes to initiate social networking application 305. In response to the user indication for social networking application 305 to execute, wireless device 301 executes social networking application 305.

While executing, social networking application 305 requires data updates in order to present the user with the most up to date postings from other social network users. Therefore, social networking application 305 transfers application data update requests to application server 304. Application server 304 is located on Internet 306. The application data is transferred to Internet 306 through base station 302 and network gateway 303. In response to the update requests, application server 304 transfers update data to wireless device 301. For example, the update requests may indicate that social networking application 305 requires the latest posting information from social network users with whom the user of wireless device 301 is associated. Application server 304 determines the latest posting information for the associated social network users and transfers the score information to wireless device 301. Social networking application 305 can then display the latest posting information from the other social network users.

The frequency of the update requests is determined by an application update rate. The application update rate indicates how often social networking application 305 may transfer application data update requests to application server 304. In this example, the application update rate has a default value of one update every five minutes. Thus, social networking application 305 can instruct wireless device 301 to transfer an application data update request to application server 304 every five minutes. The application update rate may be part of social networking application 305, part of a separate application operating on wireless device 301, or may be located within the operation software of wireless device 301.

The user of wireless device 301 sets an update profile for social networking application 305. While the update profile may include update preferences for social networking application 305 during certain times or conditions, the update profile may also be a simple setting about a application update rate preference of the user. The update profile may be set in social networking application 305, in a separate application operating on wireless device 301, or in the operating software of wireless device 301. The update profile may include specific update instructions, such as update once per minute, or may be more general, such as more or fewer updates. In this example, the user sets the update profile to allow for fewer updates during weekdays and more updates during nights and weekends. The user may want to set the profile this way because the user does not plan on using social networking application 305 very often while at work but does plan on using social networking application 305 while not at work.

While social networking application 305 is executing on wireless device 301, wireless device 301 also determines a rate at which social networking application 305 is being used. In this example, wireless device 301 determines the application usage rate for social networking application 305 by measuring the number of times that the user interacts with social networking application 305 over a period of time. This number may include the number of times that the user brings sports social networking 305 to the foreground, the number of times social networking application 305 is in the foreground when the user interface of wireless device 301 is awoken from a standby mode, the number of user inputs into social networking application 305 via a user interface, or any other way that usage of sports score application 305 may be determined. The application usage rate may be determined by social networking application 305, a separate application operating on wireless device 301, or the operation software of wireless device 301.

After determining the application usage rate for social networking application 305, wireless device 301 adjusts the application update rate based on the application usage rate and the update profile set by the user. For example, if the application usage rate determines that social networking application 305 is used once every three minutes, then the application update rate may be adjusted from once every five minutes to once every two minutes. Adjusting the application update rate higher than the application usage rate helps ensure that the user will always receive the latest social network user posting information from social networking application 305. As before, the application data update rate may be adjusted by social networking application 305, a separate application operating on wireless device 301, or the operation software of wireless device 301.

Further application data update requests from social networking application 305 are then transferred to application server 304 in accordance with the adjusted application update rate. Application server 304 then transfers social network posting information to wireless device 301 in response to the update requests. Wireless device 301 may then continue to determine the application usage rate for social networking application 305 and continue to adjust the application update rate accordingly based on the application usage rate and update profile.

Figure 6:
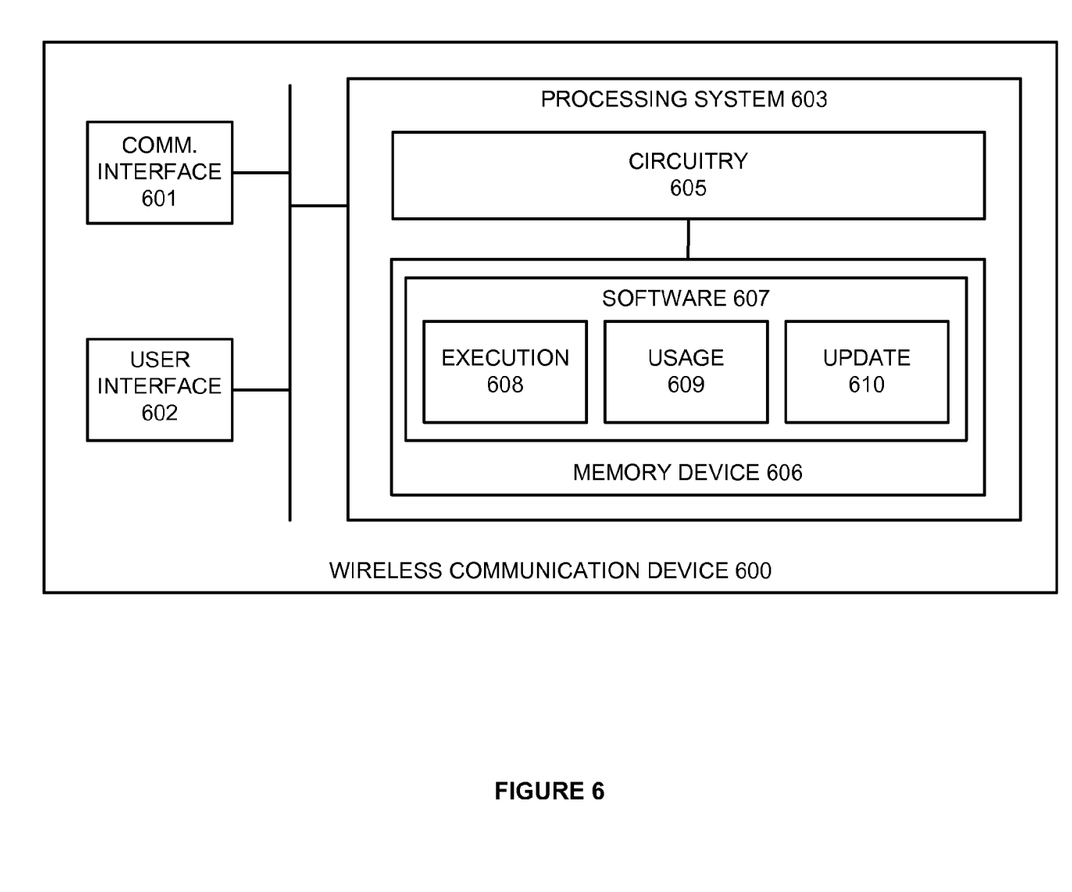
FIG. 6 illustrates a wireless communication device for adjusting an application update rate.

FIG. 6 illustrates wireless communication device 600. Wireless communication device 600 is an example of wireless communication devices 101 and 301, although devices 101 and 301 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Operating software 607 includes execution software module 608, application usage software module 609, and update control software module 610. Wireless communication device 601 may include other well-known components such as a battery and enclosure that are not shown for clarity. Wireless communication device 601 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, EVDO, WIMAX, GSM, LTE, WIFI, HSPA, or some other wireless communication format. Wireless communication interface 601 is configured to exchange communications with a wireless network, transfer application update requests to the wireless network, and receive application update data from the wireless network.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 receives user interactions for applications executing on wireless device 600.

Processing circuitry 605 comprises microprocessor and other circuitry that retrieves and executes operating software 607 from memory device 606. Memory device 606 comprises a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes execution software module 608, application usage software module 609, and update control software module 610. Operating software 607 may also include an operating system, utilities, drivers, network interfaces, applications, or some other type of software. When executed by processing circuitry 605, operating software 607 directs processing system 603 to operate wireless communication device 600 as described herein.

In particular, wireless communication interface 601 exchanges communications with a wireless communication network. Execution software module 608 directs processing system 603 to execute an application that exchanges application data in the wireless communication device with the wireless communication network. Application usage software module 609 directs processing system 603 to determine an application usage rate for the application. Update control software module 610 directs processing system 603 to adjust an application update rate for the application based on the application usage rate. Wireless communication interface 601 updates the application data over the wireless communication network based on the application update rate.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
    exchanging communications with a wireless communication network;
    executing an application that exchanges application data in the wireless communication device with the wireless communication network;
    determining an application usage rate for the executing application, wherein the application usage rate comprises a number of user inputs that interact with the application while the application is running;
    adjusting an application update rate for the application based on the application usage rate, wherein the application update rate cannot fall below a minimum application update rate; and
    updating the application data over the wireless communication network based on the application update rate.

2. The method of claim 1 wherein the application update rate is adjusted proportionally to the application usage rate.

3. The method of claim 1 further comprising determining a default application update rate for the application and wherein the application update rate is adjusted relative to the default application update rate.

4. The method of claim 3 wherein the application update rate comprises a ratio relative to the default application update rate.

5. The method of claim 1 further comprising adjusting the application update rate based on an update profile.

6. The method of claim 5 wherein the update profile allows fewer updates during periods of higher usage on the wireless communication network.

7. The method of claim 5 wherein the update profile allows more updates during periods of lower usage on the wireless communication network.

8. The method of claim 1 further comprising adjusting the application update rate based on an amount of application data exchanged by the application.

9. A wireless communication device comprising:
    a wireless communication interface configured to exchange communications with a wireless communication network;
    a processing system configured to execute an application that exchanges application data in the wireless communication device with the wireless communication network, determine an application usage rate for the executing application, wherein the application usage rate comprises a number of user inputs that interact with the application while the application is running, and adjust an application update rate for the application based on the application usage rate, wherein the application update rate cannot fall below a minimum application update rate; and
    the wireless communication interface further configured to update the application data over the wireless communication network based on the application update rate.

10. The wireless communication device of claim 9 wherein the application update rate is adjusted proportionally to the application usage rate.

11. The wireless communication device of claim 9 wherein the processing system is further configured to determine a default application update rate for the application and wherein the application update rate is adjusted relative to the default application update rate.

12. The wireless communication device of claim 11 wherein the application update rate comprises a ratio relative to the default application update rate.

13. The wireless communication device of claim 9 wherein the processing system is configured to adjust the application update rate based on an update profile.

14. The wireless communication device of claim 13 wherein the update profile allows fewer updates during periods of higher usage on the wireless communication network.

15. The wireless communication device of claim 13 wherein the update profile allows more updates during periods of lower usage on the wireless communication network.

16. The wireless communication device of claim 9 wherein the processing system is configured to adjust the application update rate based on an amount of application data exchanged by the application.

* * * * *